United States Patent Office 3,770,694
Patented Nov. 6, 1973

3,770,694
PROCESS FOR THE PRODUCTION OF NON-DIS-
COLORING, HEAT-STABLE AND DEGRADA-
TION-RESISTANT POLYISOPRENES
Gerhard Berg and Karl-Heinz Nordsiek, Marl, Germany,
assignors to Chemische Werke Huels Aktiengesellschaft,
Marl, Germany
No Drawing. Filed June 16, 1972, Ser. No. 263,664
Claims priority, application Germany, June 18, 1971,
P 21 30 118.8
Int. Cl. C08f 45/60
U.S. Cl. 260—45.9 R        20 Claims

ABSTRACT OF THE DISCLOSURE

Polyisoprene having the high resistance to thermal and mechanical stresses of natural rubber is produced by incorporation into a solution of the polyisoprene a mixture of a difunctional secondary arylamine of the formula

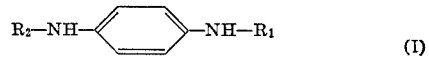

wherein $R_1$ and $R_2$ are alkyl, cycloalkyl or aryl, and an aliphatic amine of the formula $R_n(NH)_{n-1}(NH_2)_x$ wherein $x$ is 1 or 2, $n$ is 1–10 and R is alkyl when $n$ and $x$ both are 1 and alkylene when $n$ is greater than 1.

BACKGROUND OF THE INVENTION

Synthetic polybutadiene rubbers, when insufficiently stabilized, normally have a strong tendency to gelling from the effects of oxygen and temperature stresses. Under comparable conditions, more or less severe degradation occurs almost exclusively in case of natural rubber and synthetic polyisoprenes. These effects are particularly apparent under the combined thermal-mechanical stresses which are unavoidable during the course of the finishing and further processing operations. Here, natural rubber, protected by its accompanying substances, to a certain degree, has the satisfactory prerequisites for a trouble-free storage and processing operation.

In contrast thereto, synthetic polyisoprenes which are stabilized by conventional antioxidants exhibit unsatisfactory resistance to degradation under the thermal load conditions which are unavoidable during the course of the drying operation, as well as during the mixing and shaping processes. This difference in stability to thermal-mechanical degradative effects is an essential differentiating feature between synthetically produced polyisoprenes and natural rubber. Consequently, compared to natural rubber, in addition to the above-mentioned disadvantages during production and processing, polyisoprenes exhibit greater losses in important vulcanizate properties due to increased degradation. Although by modern polymerization procedures, substantial identity with the polymeric structure of natural rubber has been achieved with polyisoprenes, fully equivalent stability properties have not been attained.

The previously known stabilization methods were always limited to the utilization of sterically hindered phenols or secondary arylamines. Phenolic anti-aging substances impart insufficient degradation resistance. The use of arylamines is somewhat more advantageous but leads, in the polymerized products, to undesired discolorations which are not acceptable in many fields of application.

For examples of the use of amines as rubber stabilizers, see Boström, Kautschuk-Handbuch, Berliner Union—Stuttgart, 1961, pp. 353–381, especially 372–381.

SUMMARY OF THE INVENTION

Solution polymerized polyisoprenes having heretofore unknown high resistance to thermal and mechanical stresses which is equivalent to that of natural rubber, is produced by adding to the polyisoprene polymerization solution, optionally after the addition of a conventional shortstop agent of a stabilizing amount of a stabilizer system consisting essentially of:

(I) 0.0005–0.05 part by weight per 100 parts by weight of the polyisoprene, of a difunctional, secondary aryl amine of the general Formula I

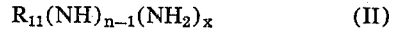 (I)

wherein $R_1$ and $R_2$, which can be identical or different, are alkyl of 1–20 carbon atoms, cycloalkyl of 5–12 carbon atoms, or mono- or dicyclic carbocyclic aryl; and (II) 0.01–1.0 part by weight per 100 parts by weight of polyisoprene, of an aliphatic amine of the general empirical Formula II $$R_{11}(NH)_{n-1}(NH_2)_x \qquad (II)$$

wherein $n$ and $x$ each are the integer 1 and R is alkyl of 2–20 carbon atoms or $n$ is an integer from 1 to 10, inclusive, $x$ is the integer 2 and R is alkylene of 2–10 carbon atoms bridging adjacent amino groups. Precipitation of the polyisoprene from solution produces stabilized raw unvulcanized solid polyisoprene having distributed therein stabilizing amounts of the amines of Formula I and Formula II.

DETAILED DISCUSSION

The solution polymerization of isoprene to an essentially cis-1,4-polyisoprene is well known and conventionally is effected in the presence of a mixed catalyst of a trialkyl-aluminum etherate, on the one hand, and a titanium halide, on the other hand, or also an organometallic lithium compound, e.g., alkyllithium and aryllithium compounds.

The isoprene is polymerized in the presence of the aforementioned catalyst systems under the usual conditions, i.e., exclusion of oxygen and water, as well as of all substances which would poison the polymerization catalyst. Suitable solvents are inert aliphatic and aromatic hydrocarbons, such as, e.g., pentane, heptane, hexane, benzene, toluene.

For a review of the polymerization of isoprene, see Van Amerongen, G. J. chapter 11, "Elastomer Stereospecific Polymerization" (A.C.S. 1966) and references cited therein.

Of the difunctional secondary aryl amines of Formula I employed in the process of this invention, preferred are:

(a) those wherein at least one of $R_1$ and $R_2$ is alkyl, particularly those wherein alkyl is of 3–8 carbon atoms; and
(b) those wherein one of $R_1$ and $R_2$ is aryl, preferably phenyl, especially those wherein the other of $R_1$ and $R_2$ is alkyl as defined in (a).

Examples of alkyl are methyl, ethyl, propyl, butyl, hexyl, octyl, nonyl, decyl and the corresponding groups substituted on one or more carbon atoms, e.g., the α, β, γ and/or ω carbon atoms, with an alkyl group of 1–4 carbon atoms, preferably methyl, to form a branched chain alkyl group, e.g., isopropyl, sec.-butyl, 1,3-dimethylbutyl, 1,4-dimethylphentyl and 1,4-dimethylheptyl.

Examples of cycloalkyl are cyclopentyl, cyclohexyl, cycloheptyl, cyclooctyl, octahydronaphthyl and the corresponding groups substituted on one or more ring carbon atoms by alkyl of 1–4 carbon atoms, preferably methyl, e.g., 2-methylcyclopentyl and 3,5-dimethylcyclohexyl.

Examples of aryl groups are phenyl, p-diphenyl and naphthyl and the corresponding groups substituted on one or more ring carbon atoms by alkyl of 1–4 carbon atoms, preferably methyl, e.g., o-tolyl, p-tolyl, sym.xylyl, p-ethylphenyl and 3,5-diethylphenyl.

Especially suitable difunctional secondary aromatic amines are

N-isopropyl-N'-phenyl-p-phenylenediamine,
N-(1,3-dimethylbutyl)-N'-phenyl-p-phenylenediamine,
N,N'-di-1,4-dimethylpentyl-p-phenylenediamine,
N,N'-di-1-methylheptyl-p-phenylenediamine,
N,N'-diphenyl-p-phenylenediamine,
N,N'-di-sec.-butyl-p-phenylendiamine,
N,N'-diisopropyl-p-phenylenediamine and
N,N'-dioctyl-p-phenylenediamine.

Others are N - phenyl - N'-2-octyl-p-phenylenediamine, N,N' - diheptyl - p-phenylenediamine and N-phenyl-N'-cyclohexyl-p-phenylenediamine. p-Phenylenediamine derivatives are individually known as ozone-protection and/or anti-aging agents for rubber vulcanizates. However, in the small quantities employed according to this invention, the stabilizing effect of these compounds, upon usual application, is neither recognizable nor detectable. A measurable stabilizing effect is observed only at concentrations which are higher by a power of ten as compared to the concentrations used in the process of this invention. In such a case, a strong discoloration of the polymers results. Moreover, these compounds were used in the prior art for the stabilization of rubber vulcanizates, whereas in the instant invention, they are employed to provide protection for unvulcanized raw rubbers against degradation.

The amounts of amines of Formula I to be employed in the process of this invention are 0.005–0.05, preferably 0.015–0.04 part by weight, per 100 parts by weight of the polyisoprene. The p-phenylenediamines, entirely ineffective by themselves in the small quantities employed in the process of this invention, exhibit a jump-like increase in their effectiveness as anti-oxidants for polyisoprene raw rubber when utilized in the combination of this invention with an aliphatic amine of the general empirical Formula II. The arylamine is usually used in a weight ratio to the aliphatic amine of about 0.5:1 to 0.025:1, preferably about 0.2:1 to about 0.05:1.

In the aliphatic amines of Formula II, which amines likewise are in effective as stabilizers when used by themselves, R is alkyl when $x$ and $n$ both are 1 and alkylene when $x$ is 2 and $n$ is greater than 1.

Preferred compounds of Formula II are those wherein:

(a) $n$ is 2 and $x$ is 2, and
(b) R is alkylene of 2–6 carbon atoms, preferably ethylene, propylene respectively trimethylene or tetramethylene etc., especially those of (a).

Examples of such amines are propylamine, isopropylamine, butylamine, cyclohexylamine, stearylamine, laurylamine, ethylenediamine, hexylenediamine (hexamethylenediamine), diethylenetriamine, dipropylenetriamine, tetraethylenepentamine.

The amounts of aliphatic amines of Formula II employed are 0.01–1.0, preferably 0.3–0.7 part by weight, per 100 parts by weight of polyisoprene.

The surprising activation of the amines of Formula I by aliphatic amines according to Formula II makes it possible—without a restriction of the desired stabilizing effect—to reduce the quantities of phenylenediamine required to surprisingly low doses, heretofore unknown amounts. At the minor concentrations employed, the troublesome discoloration of the rubber which was caused by the use of such aryldiamines individually in larger amounts is eliminated.

It will be apparent to those skilled in the art that the beforementioned aryl diamines of Formula I and aliphatic amines of Formula II added to the polyisoprene solution will be distributed, usually substantially uniformly, throughout the polyisoprene when it is precipitated from the solution. Usually about 80% to 97% of these amines which are added to the polyisoprene solution are retained in the precipitated polyisoprene. Thus, in the composition aspect, this invention relates to stabilized raw unvulcanized polyisoprene compositions having distributed, preferably substantially uniformly, in the polyisoprene a stabilizing amount of a mixture of up to 0.05, preferably 0.01 to 0.04, parts by weight of an aryl amine of Formula I and up to 1.0, preferably 0.3 to 0.6, part by weight of an aliphatic amine of Formula II, per 100 parts by weight of the polyisoprene.

The synthetic polyisoprenes containing the stabilizer system of this invention are far superior to the previously known commercial polyisoprene products in their degradation resistance at temperatures of from about 100° C. and above. They attain, and even exceed, the level of resistance displayed by the natural rubber, which heretofore has been the desired but unattainable goal.

The stabilization of the polyisoprene is conveniently effected in the solution phase of the polymerization charge after the polymerization has been terminated. Three different modes of operation are possible:

(1) If the polymerization catalyst is inactivated conventionally, e.g., by the addition of an alcohol or water, a solution of the above-described mixture of amines (0.005–0.05 part by weight, per 100 parts by weight of polyisoprene, of the aromatic amine of Formula I and 0.01–1.0 part by weight, per 100 parts by weight of polyisoprene, of the aliphatic amine of Formula II is stirred into the short-stopped and optionally water-scrubbed, polymer solution.

(2) An improvement in the stability behavior of polyisoprene can be attained by shortstopping with an amine of Formula II. Desirably, the polymerization catalyst is deactivated with the same aliphatic amine of Formula II employed in the stabilizer composition of this invention. The amount of amine required for shortstopping is dependent on the amount of $TiCl_4$ in the mixed catalyst. This amount, in case of ethylenediamine, is about 2.2 mol/mol $TiCl_4$ and, in case of dipropylenetriamine, about 1.5 mol/mol $TiCl_4$.

Without imparing the thus-obtained superior stability properties, it is impossible to conduct, after shortstopping the polymerization charge with the aliphatic amine of Formula II of this invention and without any further addition of the aliphatic amine, a sole post stabilization with 0.005–0.05 part by weight, based on 100 parts by weight of polyisoprene, of the aromatic amine of Formula I. Quite surprisingly, the amount of aliphatic amine according to Formula II employed as the shortstop agent also acts as an activator for the small amount of the p-phenylenediamine of Formula I employed.

(3) The mixtures of amines of this invention of Formula I and Formula II is employed as the shortstop agent for the polymerization. In such a case, additional stabilization is not necessary. This embodiment is particularly advantageous from the viewpoint of processing technology.

Suitable solvents for the amines are the same nonpolar hydrocarbons which are also suitable for the solution polymerization of isoprene, e.g., n-pentane, n-hexane, preferably benzene and toluene.

When proceeding in accordance with the shortstop and stabilizing procedure of the present invention, polyisoprenes are obtained from the polymer solutions, while maintaining the conventional working-up processes, which are far superior to all previously known synthetic polyisoprenes with respect to their stability against thermal-mechanical stress. In most instances, their stability is at least equal to natural rubber.

The surprising improvement in the properties of the raw nonvulcanized polyisoprene rubber attained according to the process of this invention renders the polyisoprene manufacturing process more economical in multiple respects.

This manufacturing process starts with the drying of water-moist polyisoprene by means of screw-type dryers. The more rugged processability made possible by the increased stability with respect to thermal-mechanical stress permits, without danger of degradation, an increase in the material throughput per unit time and thus provides an improvement in process economy.

The thus-attained advantages are of special value for rubber processing technology. Here again, in mixing and shaping processes, it is possible to use more stringent conditions than was previously possible, without any impairment of the phyical properties of the finished article. As a result, a more economical utilization of the processing units is attained.

Because of the amounts of amines employed in this invention as stabilizers, which are inordinately low for polyisoprene, the process of this invention results in considerable lowering of expenses in the manufacture of synthetic polyisoprene.

Furthermore, the stabilizer system of this invention evokes, in addition to displaying a stability-promoting effect, an enormous acceleration of the vulcanization so that the behavior of natural rubber with respect to chemical reactivity regarding cross-linking vulcanizing agents is achieved. As a consequence, the additional economic advantage of saving accelerators is obtained.

The stabilizer system of this invention also exerts an advantageous influence on disturbing reversion phenomena during longer heating times of the specimens and articles under vulcanization. Because such heating times are frequently unavoidable during the manufacture of thick-walled articles, the suppression of this reversion phenomena is of particular importance.

Finally, according to the process of this invention, polyisoprenes are obtained which, due to their low degradation tendency, can be advantageously utilized for the production of oil-extended rubbers.

The stabilized raw unvulcanized polyisoprenes produced in accordance with the present invention can be processed in all manners customary in the art, e.g., in the presence or absence of fillers, e.g., carbon blacks, silicic acid and kaolin, etc., using ordinary vulcanizing agents and, optionally, plasticizers, as well as additional ozone-protecting and anti-aging agents.

The polyisoprenes produced according to the present invention are excellent raw materials for the production of a great variety of rubber articles, such as, for example, tires, conveyor belts, hoses, soles, as well as elastic, light-colored articles.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

(1) PREPARATION OF THE POLYISOPRENE SOLUTION

A solution of 35 kg. of isoprene in 315 kg. of commercially available hexane is charged into a 500 liter polymerization reaction filled with nitrogen, free of water and fitted with a reflux condenser, an impeller agitator and a vacuum-pump connection. By adjusting the pressure to 110 torr, the solvent/monomer mixture is cooled to $+10°$ C. The polymerization is started by adding the mixed catalyst, produced from solutions of 186.4 g. of triethylaluminum dibutyl etherate and 246 g. of titanium tetrachloride in hexane. After one hour, a conversion of about 50% is attained, during which period, at an almost constant pressure of about 110 torr, the temperature of the reaction mixture increases to 14° C. Within the next two hours, the pressure is gradually raised to 180 torr, whereby the polymerization temperature increases to 25° C. The thus-obtained conversion is 85%. By the introduction of nitrogen, the pressure is increased to normal pressure, whereby the temperature rises to 27° C. After another hour, a conversion of 95% has been attained. The total polymerization time is 4 hours.

(2) DEACTIVATION OF THE POLYMERIZATION CATALYST AND STABILIZATION OF THE SHORTSTOPPED SOLUTION

The deactivation of the polymerization catalyst is accomplished outside of the polymerization reactor in a continuous mixer. The polymer solution is pumped, via a stainless steel conduit and a flowmeter, into a continuous mixer provided with a connection pipe for adding one of the following shortstop solutions:

(a) 5.0 mol methanol/mol $TiCl_4$ (solution in hexane);

(b) 1.2 mol ethylenediamine/mol $TiCl_4$ (solution in benzene); or (c) 1.5 mol dipropylenetriamine/mol $TiCl_4$ (solution in benzene).

The shortstopped solution is not washed with water. Only about 1–2% by volume of water is introduced with agitation into the shortstopped solution via a connection pipe disposed at the end of the continuous mixer. The shortstopped solution is pumped into a storage tank, from which quantities of the solution can be withdrawn for stabilizing experiments. The stabilizers are introduced into the polymer solution in the form of solutions in hexane or benzene with the aid of a "Hoesch" agitator in a mixing vessel.

(3) PRODUCTION OF POLYISOPRENE FROM THE SHORTSTOPPED AND STABILIZED POLYMER SOLUTION

After adding the selected stabilizer under agitation, polyisoprene crumbs are obtained by introducing the solution into a water-filled and heated agitator-equipped vessel. Temperatures are employed which range above the boiling point of the mixture consisting of water and solvent. An agitator is utilized, the ends of which are arranged in blade configuration. By means of a vapor pipe arranged in the lid of the container, all vapors are conducted out of the container into a condenser. The water discharged from the system, together with the rubber crumbs which have been freed of the solvent, is separated from the polyisoprene crumbs with the aid of screens. The polyisoprene, loaded on screen racks after the crumb production, is dried in a circulating-air chamber. At an air circulation temperature of 75° C., the crumbs are dewatered over a period of 10–14 hours to a residual moisture content of 0.3%.

(4) CONDUCTANCE OF THE ROLLING TEST

In these experiments a rolling mill is employed having an operating width of 450 mm. and a roll diameter of 250 mm. The rotary speed of the front roll is 24 r.p.m., that of the rear roll is 29 r.p.m. (=friction 1:1.2). The roll nip is adjusted to a width of 0.7 mm. After heating to 150° C., 300 g. of the sample of raw unvulcanized polyisoprene is exposed for periods of up to 15 minutes to the shear stress produced under these conditions with rotating rolls. The subsequent determination of the ML–4 values is effected according to the DIN [German Industrial Standard] 53,523.

(5) RESULTS OF EXPERIMENTS AND TESTS

The following is a definition of the abbreviations of the chemical compounds and the trade names utilized in the tables below:

EDA: ethylenediamine
DPTA: dipropylenetriamine
KB: 2,6-di-tert.-butyl-p-cresol (commercial product of Farbenfabriken Bayer A.G.)

BKF: 2,2'-methylenebis(6-tert.-butyl-p-cresol)
Santowhite powder: 4,4' - butylidenebis(2-tert.-butyl - 5-methylphenol) (commercial product of Monsanto)
4010 Na: N-isopropyl-N'-phenyl - p - phenylenediamine (commercial product of Farbenfabriken Bayer A.G.)
4030: N,N'-di-1,4-dimethylpentyl - p - phenylenediamine (commercial product of Farbenfabriken Bayer A.G.)
Santoflex 13: N-1,3-dimethylbuyl-N'-phenyl-p-phenylenediamine (commercial product of Monsanto)

CP: comparison product with conventional stabilization
p.b.w.: parts by weight per 100 parts by weight of polyisoprene.

Table 1 shows the properties of polyisoprenes (methanol shortstop agent) stabilized by a conventional non-discoloring phenolic type stabilizer (Product No. I) and a discoloring arylamine type stabilizer (Product No. II), with usual dosages. The effect of an aliphatic amine (Product No. III) is also shown. The effect of the combination of an aliphatic amine with an aromatic amine is clearly shown by the jump-like increase in stabilization achieved with Product No. IV. The usual discoloration occurs in the range of the concentration selected for this example.

Table 2 gives the properties of several polyisoprenes (dipropylenetriamine shortstop agent) which demonstrate by comparison the state of the art (Product No. I), the surprisingly high effectiveness (Products II through XII) of very small dosages of an aromatic amine derivative in combination with an aliphatic amine which is entirely ineffective by itself (Product XIII). The novel compositions with low aryl contents (Products VIII through XII) exhibit no discoloration whatsoever.

TABLE 2

| Product number | Stabilizer 1 Type | P.b.w. | Stabilizer 2 Type | P.b.w. | Color of product | ML-4 after rolling test at 150° C. 0' | 2½' | 5' | 10' | 15' |
|---|---|---|---|---|---|---|---|---|---|---|
| I | KB | 0.4 | | 0 | Light | 76 | 52 | 36 | 23 | 12 |
| II | DPTA | 0.4 | 4010 Na | 0.5 | Dark | 76 | 64 | 62 | 57 | 52 |
| III | DPTA | 0.4 | 4010 Na | 0.2 | do | 76 | 64 | 61 | 56 | 52 |
| IV | DPTA | 0.4 | 4010 Na | 0.1 | do | 76 | 66 | 62 | 56 | 51 |
| V | DPTA | 0.4 | 4010 Na | 0.08 | do | 76 | 65 | 62 | 57 | 52 |
| VI | DPTA | 0.4 | 4010 Na | 0.06 | Faintly dark | 76 | 64 | 61 | 55 | 51 |
| VII | DPTA | 0.4 | 4010 Na | 0.05 | Light | 76 | 68 | 64 | 55 | 50 |
| VIII | DPTA | 0.4 | 4010 Na | 0.04 | do | 76 | 67 | 63 | 54 | 48 |
| IX | DPTA | 0.4 | 4010 Na | 0.03 | do | 76 | 66 | 62 | 52 | 46 |
| X | DPTA | 0.4 | 4010 Na | 0.02 | do | 76 | 67 | 61 | 50 | 43 |
| XI | DPTA | 0.4 | 4010 Na | 0.01 | do | 75 | 55 | 46 | 35 | 30 |
| XII | DPTA | 0.4 | 4010 Na | 0.005 | do | 76 | 52 | 45 | 30 | 23 |
| XIII | DPTA | 0.4 | 4010 Na | 0 | do | 76 | 51 | 35 | 21 | 10 |

Table 3 shows, in addition to polyisoprene stabilized in accordance with the state of the art (I) and the entirely unsatisfactory effectiveness of the individual amines alone (II, III), the jump-like increase in the stabilizing effect at the optimum dosage of various aliphatic amines together with various aromatic amines (IV–IX).

TABLE 3

| Product number | Stabilizers Type 1 | P.b.w. | Type 2 | P.b.w. | ML-4 after rolling test at 150° C. 0' | 2½' | 5' | 10' | 15' |
|---|---|---|---|---|---|---|---|---|---|
| I (CP) | KB | 0.4 | | 0 | 74 | 40 | 29 | 18 | 8 |
| II | DPTA | 0.4 | | 0 | 77 | 41 | 28 | 18 | 9 |
| III | | 0 | 4010 Na | 0.04 | 75 | 45 | 32 | 21 | 11 |
| IV | DPTA | 0.4 | 4010 Na | 0.04 | 77 | 64 | 51 | 45 | 36 |
| V | DPTA | 0.4 | Santoflex 13 | 0.04 | 79 | 60 | 53 | 45 | 35 |
| VI | DPTA | 0.4 | 4030 | 0.04 | 78 | 65 | 56 | 47 | 39 |
| VII | EDA | 0.4 | 4010 Na | 0.04 | 77 | 63 | 53 | 42 | 34 |
| VIII | EDA | 0.4 | Santoflex 13 | 0.04 | 78 | 65 | 57 | 48 | 41 |
| IX | EDA | 0.4 | 4030 | 0.04 | 78 | 64 | 56 | 45 | 38 |

TABLE I

| Product number | Stabilizers Type | P.b.w. | Polyisoprene color | ML-4 after rolling test at 150° C. 0' | 2½' | 5' | 10' | 15' |
|---|---|---|---|---|---|---|---|---|
| I | BKF | 0.4 | Light | 87 | 49 | 40 | 23 | 15 |
| II | 4010 Na | 0.4 | Dark | 86 | 50 | 42 | 25 | 19 |
| III | DPTA | 0.4 | Light | 86 | 46 | 39 | 20 | 12 |
| IV | 4010 Na / DPTA | 0.4 / 0.4 | Dark | 87 | 73 | 65 | 48 | 43 |

Table 4 shows the extremely weak stabilizing effect of customary stabilizers (I, IV and VII), as well as of the aliphatic amines of this invention alone (II, V and VIII) compared to the jump-like increase in stability when using the stabilizer combinations of this invention (III, VI, IX–XII).

TABLE 4

| Product number | Shortstop Type | M/M, Ti | Stabilizers Type 1 | P.b.w. | Type 2 | P.b.w. | ML-4 after rolling test at 150° C. 0' | 2½' | 5' | 10' | 15' |
|---|---|---|---|---|---|---|---|---|---|---|---|
| I (CP) | EDA | 2.2 | BKF | 0.4 | | 0 | 80 | 38 | 25 | 20 | 14 |
| II | EDA | 2.2 | EDA | 0.4 | | 0 | 80 | 30 | 25 | 14 | 7 |
| III | EDA | 2.2 | EDA | 0.4 | 4010 Na | 0.04 | 81 | 70 | 64 | 53 | 45 |
| IV (CP) | DPTA | 1.5 | KB | 0.4 | | 0 | 75 | 49 | 38 | 23 | 12 |
| V | DPTA | 1.5 | DPTA | 0.4 | | 0 | 76 | 51 | 36 | 21 | 15 |
| VI | DPTA | 1.5 | DPTA | 0.4 | 4010 Na | 0.04 | 77 | 67 | 54 | 49 | 45 |
| VII (CP) | EDA | 2.2 | KB | 0.4 | | 0 | 87 | 42 | 26 | 16 | 9 |
| VIII | EDA | 2.2 | DPTA | 0.4 | | 0 | 85 | 51 | 31 | 17 | 12 |
| IX | EDA | 2.2 | DPTA | 0.4 | 4010 Na | 0.04 | 87 | 78 | 74 | 61 | 52 |
| X | EDA | 2.2 | DPTA | 0.4 | 4030 | 0.04 | 88 | 77 | 73 | 64 | 57 |
| XI | DPTA | 1.5 | DPTA | 0.4 | 4030 | 0.04 | 78 | 71 | 62 | 53 | 48 |
| XII | EDA | 2.2 | EDA | 0.4 | 4030 | 0.04 | 82 | 75 | 68 | 54 | 47 |

Table 5 demonstrates the effectiveness of conventional stabilizers (I, VIII) and of the amine combinations of this invention, wherein the entire proportion of the aliphatic amine simultaneously serves as the shortstop agent for the polymerization reaction.

TABLE 5

| Product number | Shortstop Type | M/M, Ti | Stabilizer 2 Type | P.b.w. | ML-4 after rolling test at 150° C. | | | | |
|---|---|---|---|---|---|---|---|---|---|
| | | | | | 0' | 2½' | 5' | 10' | 15' |
| I (CP) | EDA | 2.2 | KB | 0.5 | 91 | 61 | 46 | 25 | 18 |
| II | EDA | 2.2 | 4010 Na | 0.02 | 91 | 70 | 65 | 51 | 42 |
| III | EDA | 2.2 | 4010 Na | 0.04 | 91 | 73 | 70 | 56 | 47 |
| IV | EDA | 2.2 | 4030 | 0.02 | 91 | 71 | 67 | 54 | 45 |
| V | EDA | 2.2 | 4030 | 0.04 | 92 | 72 | 68 | 56 | 52 |
| VI | EDA | 2.2 | Santoflex 13 | 0.02 | 90 | 72 | 58 | 45 | 37 |
| VII | EDA | 2.2 | ....do | 0.04 | 91 | 76 | 69 | 55 | 46 |
| VIII (CP) | DPTA | 1.5 | BKF | 0.4 | 86 | 57 | 42 | 30 | 21 |
| IX | DPTA | 1.5 | 4010 Na | 0.04 | 87 | 72 | 69 | 58 | 48 |
| X | DPTA | 1.5 | 4030 | 0.04 | 88 | 75 | 68 | 58 | 51 |
| XI | DPTA | 1.5 | Santoflex 13 | 0.04 | 87 | 73 | 67 | 54 | 47 |

Table 6 shows the effectiveness of the amine combination of the present invention (II, IV, VI) in contrast to conventional stabilizers (I, III, V), wherein the mixture of the amines simultaneously serves for shortstopping purposes.

TABLE 6

| Product number | Shortstop Type | Amount | Stabilizer Type | P.b.w. | ML-4 after rolling test at 150° C. | | | | |
|---|---|---|---|---|---|---|---|---|---|
| | | | | | 0' | 2½' | 5' | 10' | 15' |
| I (CP) | EDA | 2.2 M/M, Ti | KB | 0.4 | 84 | 52 | 36 | 20 | 13 |
| II | {EDA / 4010 Na} | {2.2 M/M, Ti / 0.04, phr} | | 0 | 85 | 70 | 61 | 50 | 46 |
| III (CP) | DPTA | 1.5 M/M, Ti | BKF | 0.4 | 84 | 54 | 36 | 23 | 16 |
| IV | {DPTA / 4030} | {1.5 M/M, Ti / 0.04, phr} | | 0 | 86 | 72 | 65 | 50 | 47 |
| V (CP) | C₆H₁₂(NH₂)₂ | 2.2 M/M, Ti | Santo-white powder | 0.4 | 85 | 53 | 37 | 22 | 17 |
| VI | {C₆H₁₂(NH₂)₂ / Santoflex 13} | {2.2 M/M, Ti / 0.04, phr} | | 0 | 86 | 73 | 64 | 52 | 45 |

The products described in Table 7 all contain 25 parts of naphthenic extender oil. The use of the amine combination of this invention also demonstrates in this table the jump-like rise in degradation resistance as compared to the state of the art (I).

TABLE 7

| Product number | Stabilizer Type 1 | P.b.w. | Type 2 | P.b.w. | ML-4 after rolling test at 150° C. | | | | |
|---|---|---|---|---|---|---|---|---|---|
| | | | | | 0' | 2½' | 5' | 10' | 15' |
| I (CP) | KB | 0.4 | | 0 | 38 | 20 | 12 | 6 | 2 |
| II | DPTA | 0.4 | 4030 | 0.02 | 37 | 33 | 30 | 25 | 22 |
| III | DPTA | 0.4 | 4030 | 0.04 | 43 | 40 | 37 | 32 | 30 |
| IV | EDA | 0.4 | 4010 NA | 0.02 | 37 | 32 | 29 | 24 | 20 |
| V | EDA | 0.4 | 4010 NA | 0.04 | 41 | 39 | 35 | 32 | 28 |

Table 8 shows the high effectiveness of the stabilizing process of this invention in the presence of 25 parts of a naphthenic extender oil. In this series of experiments, an aliphatic amine (DPTA) was employed as the shortstop agent instead of $CH_3OH$.

TABLE 8

| Product number | Stabilizer Type 1 | P.b.w. | Type 2 | P.b.w. | ML-4 after rolling test at 150° C. | | | | |
|---|---|---|---|---|---|---|---|---|---|
| | | | | | 0' | 2½' | 5' | 10' | 15' |
| I (CP) | KB | 0.4 | | 0 | 45 | 29 | 23 | 15 | 5 |
| II | DPTA | 0.4 | | 0 | 47 | 37 | 29 | 16 | 9 |
| III | DPTA | 0.4 | 4030 | 0.02 | 49 | 43 | 40 | 35 | 32 |
| IV | DPTA | 0.4 | 4030 | 0.04 | 48 | 44 | 42 | 38 | 35 |
| V | DPTA | 0.4 | Santoflex 13 | 0.04 | 48 | 43 | 41 | 37 | 34 |
| VI | DPTA | 0.4 | 4010 NA | 0.04 | 47 | 42 | 40 | 36 | 33 |

Table 9 is a comparison of the thermal degradation resistance of various commercial polyisoprenes, as well as natural rubber, with a Ziegler polyisoprene stabilized according to this invention. The superiority of the stabilizer system of the present invention is clearly demonstrated.

TABLE 9

| Product | ML-4 after rolling test at 150° C. | | | | |
|---|---|---|---|---|---|
| | 0' | 2½' | 5' | 10' | 15' |
| Natural rubber sheets (premasticated in the cold state) | 90 | 79 | 72 | 54 | 46 |
| Natsyn 2200 [1] | 78 | 56 | 45 | 28 | 16 |
| Ameripol SN 600 [2] | 81 | 56 | 45 | 32 | 18 |
| Cariflex IR 305 | 67 | 50 | 35 | 13 | 7 |
| Ziegler polyisoprene with novel stabilizer system [3] | 80 | 70 | 64 | 53 | 46 |

[1] TM for a cis-1,4-polyisoprene synthetic rubber essentially duplicating the chemical structure of natural rubber. (The Goodyear Tire & Rubber Co.).
[2] TM for a synthetic cis-polybutadiene rubber (Goodrich-Gulf Chemicals).
[3] Stabilizer 0.04 p.b.w. N-isopropyl-N'-phenyl-p-phenylenediamine in combination with 0.4 p.b.w. dipropylenetriamine.

Table 10 shows the effectiveness of the stabilization technique of this invention as compared to the state of the art (stabilizer KB) and natural rubber as measured by plasticity retention index (PRI) [SMR—Bulletin No. 3 (1966)].

TABLE 10

| Product | Stabilizer | PRI |
|---|---|---|
| Natural rubber sheets | | 100 |
| Experimental product: | | |
| A | 0.4 p.b.w. KB | 87 |
| B | {0.4 p.b.w. DPTA, 0.04 p.b.w. 4010 Na} | 100 |
| C | {0.4 p.b.w. DPTA, 0.04 p.b.w. 4030} | 100 |

Table 11 is the vulcanization recipe utilized for the further testing of the experimental products stabilized in accordance with this invention.

The mixture for the vulcanizates of Table 12 was prepared in an internal mixer, type GK2, speed of front rotor 40 r.p.m., jacket temperature 40° C., mixing time 4 minutes.

TABLE 11

| | Parts |
|---|---|
| Rubber | 100 |
| Stearic acid | 2 |
| ZnO | 3 |
| HAF [high abrasion furnace] carbon black | 50 |
| Aromatic plasticizer oil | 10 |
| Sulfur [1] | 2.5 |
| N-cyclohexylbenzothiazolesulfenamide [1] | 0.5 |

[1] These were admixed on a rolling mill after preparation of the basic mixture at 50° C.

Table 12 below is a summary of the processing and vulcanization properties of polyisoprenes of this invention (Band C) compared to a conventional polyisoprene (A) and to natural rubber, in accordance with the recipe set forth in Table 11.

TABLE 12

| Rubber | Stabilizer, p.b.w. | Mixture ML-4 | Gross Tensile strength, kg./cm.² | Gross Elongation | Vulcanization, 143° C., min. | Tensile strength, kg./cm.² | Elongation, percent | Modulus 300% | Tear strength, acc. to Pohle | Permanent elongation | Hardness, degrees Shore | Elasticity 22° C. | Elasticity 75° C. |
|---|---|---|---|---|---|---|---|---|---|---|---|---|---|
| Natural rubber sheet | | 50 | 25 | 422 | 10 | 174 | 590 | 59 | 22 | 22 | 53 | 39 | 50 |
| | | | | | 30 | 211 | 502 | 109 | 32 | 25 | 62 | 43 | 60 |
| | | | | | 60 | 234 | 538 | 112 | 29 | 25 | 61 | 41 | 58 |
| | | | | | 120 | 189 | 492 | 96 | 26 | 18 | 60 | 40 | 53 |
| Experimental product: | | | | | | | | | | | | | |
| A | 0.4, KB | 60 | 3 | 423 | 10 | 48 | 614 | 10 | 3 | 40 | 41 | 34 | 35 |
| | | | | | 30 | 237 | 580 | 96 | 33 | 27 | 60 | 46 | 60 |
| | | | | | 60 | 218 | 560 | 90 | 26 | 24 | 60 | 44 | 58 |
| | | | | | 120 | 205 | 570 | 82 | 23 | 20 | 58 | 41 | 55 |
| B | {0.4, DPTA, 0.04, 4010 Na} | 61 | 11 | 553 | 10 | 240 | 598 | 87 | 34 | 25 | 58 | 45 | 60 |
| | | | | | 30 | 238 | 504 | 125 | 27 | 28 | 64 | 48 | 60 |
| | | | | | 60 | 218 | 478 | 122 | 24 | 22 | 64 | 46 | 60 |
| | | | | | 120 | 209 | 560 | 109 | 22 | 19 | 60 | 44 | 61 |
| C | {0.4, DPTA, 0.04, 4030} | 61 | 12 | 560 | 10 | 225 | 590 | 89 | 32 | 24 | 58 | 44 | 58 |
| | | | | | 30 | 337 | 502 | 122 | 26 | 29 | 65 | 48 | 63 |
| | | | | | 60 | 207 | 456 | 122 | 26 | 22 | 64 | 46 | 62 |
| | | | | | 120 | 205 | 400 | 109 | 22 | 18 | 61 | 44 | 56 |

Table 13 is also a summary of the processing and vulcanizate properties of polyisoprenes of this invention (Band C) compared to a conventional polyisoprene and to natural rubber. In contrast to the directions indicated in Table 11, more stringent mixing conditions of a rotor speed to 60 r.p.m. and a jacket temperature to 110° C. is employed.

TABLE 13

| Rubber | Stabilizer, p.b.w. | Mixture ML-4 | Gross Tensile strength, kg./cm.² | Gross Elongation | Vulcanization, 143° C., min. | Tensile strength, kg./cm.² | Elongation, percent | Modulus 300% | Tear strength, acc. to Pohle | Permanent elongation | Hardness, degrees Shore | Elasticity 22° C. | Elasticity 75° C. |
|---|---|---|---|---|---|---|---|---|---|---|---|---|---|
| Natural rubber sheets | | 47 | 5 | 388 | 10 | 209 | 568 | 74 | 24 | 19 | 54 | 42 | 54 |
| | | | | | 30 | 243 | 540 | 115 | 37 | 29 | 61 | 46 | 62 |
| | | | | | 60 | 238 | 528 | 109 | 28 | 26 | 61 | 44 | 61 |
| | | | | | 120 | 199 | 486 | 96 | 23 | 17 | 59 | 42 | 57 |
| Experimental product: | | | | | | | | | | | | | |
| A | 0.4, KB | 53 | 1 | 448 | 10 | 55 | 584 | 16 | 4 | 35 | 42 | 36 | 38 |
| | | | | | 30 | 243 | 554 | 102 | 26 | 25 | 60 | 46 | 62 |
| | | | | | 60 | 193 | 526 | 95 | 26 | 16 | 60 | 46 | 62 |
| | | | | | 120 | 181 | 464 | 80 | 22 | 17 | 58 | 42 | 56 |
| B | {0.4, DPTA, 0.04, 4010 Na} | 58 | 9 | 448 | 10 | 234 | 562 | 93 | 36 | 20 | 58 | 46 | 60 |
| | | | | | 30 | 240 | 476 | 135 | 27 | 25 | 64 | 49 | 65 |
| | | | | | 60 | 232 | 470 | 125 | 21 | 22 | 64 | 49 | 65 |
| | | | | | 120 | 194 | 448 | 112 | 21 | 14 | 61 | 45 | 61 |
| C | {0.4, DPTA, 0.04, 4030} | 59 | 9 | 448 | 10 | 234 | 580 | 89 | 33 | 22 | 57 | 46 | 62 |
| | | | | | 30 | 228 | 468 | 128 | 27 | 25 | 64 | 49 | 65 |
| | | | | | 60 | 231 | 486 | 122 | 23 | 23 | 64 | 47 | 64 |
| | | | | | 120 | 203 | 470 | 109 | 19 | 16 | 61 | 44 | 40 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Stabilized raw unvulcanized polyisoprene having distributed therein a stabilizing amount of a mixture of:
   (I) up to 0.05 part by weight, per 100 parts by weight of the polyisoprene, of a difunctional, secondary aryl amine of the formula

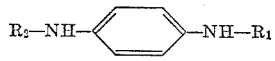

wherein $R_1$ and $R_2$ each are alkyl of 1–20 carbon atoms, cycloalkyl of 5–12 carbon atoms, or mono- or dicyclic aryl, and
   (II) up to 1.0 part by weight, per 100 parts by weight of the polyisoprene, of an aliphatic amine of the formula

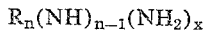
   $$R_n(NH)_{n-1}(NH_2)_x$$

wherein either $x$ and $n$ each are the integer 1 and R is alkyl of 2–20 carbon atoms or $n$ is an integer from 1 to 10, $x$ is the integer 2 and R is alkylene of 2–10 carbon atoms bridging adjacent amino groups.

2. A stabilized polyisoprene according to claim 1 wherein at least one of $R_1$ and $R_2$ is alkyl.
3. A stabilized polyisoprene according to claim 2 wherein alkyl is of 3–8 carbon atoms.
4. A stabilized polyisoprene according to claim 1 wherein one of $R_1$ and $R_2$ is phenyl and the other is phenyl or alkyl of 3–8 carbon atoms.
5. A stabilized polyisoprene according to claim 1 wherein $n$ is 1 or 2 and $x$ is 2.
6. A stabilized polyisoprene according to claim 1 wherein R is alkylene of 2–6 carbon atoms.
7. A stabilized polyisoprene according to claim 6 wherein $n$ is 1 or 2 and $x$ is 2.
8. A stabilized polyisoprene according to claim 7 wherein one of $R_1$ and $R_2$ is phenyl and the other is phenyl or alkyl of 3–8 carbon atoms.
9. A stabilized polyisoprene according to claim 1 wherein the aromatic amine is N,N'-diphenyl-p-phenylene-diamine,
   N-isopropyl-N'-phenyl-p-phenylenediamine,
   N-(1,3-dimethylbutyl)-N'-phenyl-p-phenylenediamine,
   N,N'-di-1,4-dimethylpentyl-p-phenylenediamine,
   N,N'-di-1-methylheptyl-p-phenylenediamine,
   N,N'-di-sec.-butyl-p-phenylenediamine,
   N,N'-diisopropyl-p-phenylenediamine or
   N,N'-di-octyl-p-phenylenediamine.

10. A stabilized polyisoprene according to claim 9 wherein the aliphatic amine is propylamine, isopropylamine, butylamine, cyclohexylamine, stearylamine, laurylamine, ethylenediamine, hexamethylenediamine, diethylenetriamine, dipropylenetriamine or tetramethylenepentamine.

11. A stabilized polyisoprene according to claim 9 wherein the aliphatic amine is propylamine, isopropylamine, butylamine, cyclohexylamine, stearylamine, laurylamine, ethylenediamine, hexamethylenediamine, diethylenetriamine, dipropylenetriamine or tetramethylenepentamine.

12. A stabilized polyisoprene according to claim 1 wherein the aromatic amine is N-isopropyl-N'-phenyl-p-phenylenediamine, N-(1,3-dimethylbutyl)-N'-phenyl-p-phenylenediamine or N,N'-di-1,4-dimethylpentyl-p-phenylenediamine and the aliphatic amine is ethylenediamine or dipropylenetriamine.

13. A process for the production of a stabilized polyisoprene according to claim 1 which comprises the steps of adding to a solution of raw, unvulcanized unstabilized polyisoprene:
   (I) 0.005–0.05 part by weight, per 100 parts by weight of the polyisoprene, of the secondary aryl amine of the formula

wherein $R_1$ and $R_2$ each are alkyl of 1–20 carbon atoms, cycloalkyl of 5–12 carbon atoms, or mono- or dicyclic aryl, and
   (II) 0.01–1.0 part by weight, per 100 parts by weight of the polyisoprene, of aryl amine, or an aliphatic amine of the formula

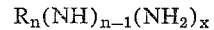
   $$R_n(NH)_{n-1}(NH_2)_x$$

wherein either $x$ and $n$ each are the integer 1 and R is alkyl of 2–20 carbon atoms or $n$ is an integer from 1 to 10, $x$ is the integer 2 and R is alkylene of 2–10 carbon atoms bridging adjacent amino groups.

14. A process according to claim 13 wherein the aliphatic amine is added as a shortstop agent to a solution of the polyisoprene containing an active catalyst followed by the aryl amine.

15. A process according to claim 13 wherein the mixture of amines is also employed as the shortstop agent in the polymerization of the polyisoprene.

16. A process according to claim 13 wherein the aromatic amine is

N,N'-diphenyl-p-phenylenediamine,
   N-iso-propyl-N'-phenyl-p-phenylenediamine,
   N-(1,3-dimethylbutyl)-N'-phenyl-p-phenylenediamine,
   N,N'-di-1,4-dimethylpentyl-p-phenylenediamine,
   N,N'-di-1-methylheptyl-p-phenylenediamine,
   N,N'-di-sec.-butyl-p-phenylenediamine,
   N,N'-diisopropyl-p-phenylenediamine or
   N,N'-di-octyl-p-phenylenediamine.

17. A process according to claim 13 wherein the aliphatic amine is propylamine, isopropylamine, butylamine, cyclohexylamine, stearylamine, laurylamine, ethylenediamine, hexamethylenediamine, diethylenetriamine, dipropylenetriamine or tetramethylenepentamine.

18. A process according to claim 15 wherein the aliphatic amine is propylamine, isopropylamine, butylamine, cyclohexylamine, stearylamine, laurylamine, ethylenediamine, hexamethylenediamine, diethylenetriamine, dipropylenetriamine or tetramethylenepentamine.

19. A stabilizer composition for raw unvulcanized polyisoprenes consisting essentially of a mixture of:
   (I) a difunctional, secondary aryl amine of the formula

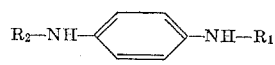

wherein $R_1$ and $R_2$ each are alkyl of 1–20 carbon atoms, cycloalkyl of 5–12 carbon atoms, or mono- or dicyclic aryl, and
   (II) an aliphatic amine of the formula

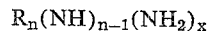
   $$R_n(NH)_{n-1}(NH_2)_x$$

wherein $n$ is an integer from 1 to 10 and $x$ is the integer 1 or 2 and R, when $x$ and $n$ both are 1, is alkyl of 2–20 carbon atoms, or, when $x$ is 2 and $n$ is an integer from 1 to 10, alkylene of 2–10 carbon atoms, in a weight ratio of (I) to (II) of about 0.5:1 to 0.025:1.

20. A stabilizer composition according to claim 19 as a solution in a nonpolar solvent.

References Cited

UNITED STATES PATENTS

| | | | |
|---|---|---|---|
| 3,632,549 | 1/1972 | La Heij et al. | 260—45.9 R |
| 3,630,989 | 11/1971 | Hunt et al. | 260—45.9 R |
| 3,657,170 | 4/1972 | Oberster et al. | 260—45.9 R |
| 3,337,494 | 8/1967 | Reid et al. | 260—45.9 R |

MAURICE J. WELSH, JR., Primary Examiner

U.S. Cl. X.R.

252—401; 260—41.5 R, 41.5 A

UNITED STATES PATENT OFFICE
CERTIFICATE OF CORRECTION

Patent No. 3,770,694    Dated November 6, 1973

Inventor(s) Gerhard Berg, et al.

It is certified that error appears in the above-identified patent and that said Letters Patent are hereby corrected as shown below:

IN THE CLAIMS:

CLAIM 10, COLUMN 13, LINE 1:   "claim 9" should read -- claim 1 --

CLAIM 13, COLUMN 14, LINE 19   "or" should read -- of --.

Signed and sealed this 9th day of April 1974.

(SEAL)
Attest:

EDWARD M. FLETCHER, JR.
Attesting Officer

C. MARSHALL DANN
Commissioner of Patents